Sherman & Gunn.
Sawing Machine.

No. 113,698. Patented Apr. 11, 1871.

2 Sheets, Sheet 1.

Witnesses
C. L. Buck
D. A. Yeatman

Inventor
S. S. Sherman
H. B. Gunn
per
Alexander Mason
attys.

2 Sheets, Sheet 2.

Sherman & Gunn,
Sawing Machine.

No. 113,698. Patented Apr. 11, 1871.

Witnesses
C. L. Curt.
A. E. Yeatman

Inventor
S. S. Sherman
H. B. Gunn
per Alexander Mason
Atty

UNITED STATES PATENT OFFICE.

SAMUEL S. SHERMAN AND HIRAM B. GUNN, OF EAU CLAIRE, WISCONSIN.

IMPROVEMENT IN SAWING-MACHINES.

Specification forming part of Letters Patent No. 113,698, dated April 11, 1871.

*To all whom it may concern:*

Be it known that we, SAMUEL S. SHERMAN and HIRAM B. GUNN, of Eau Claire, in the county of Eau Claire, and in the State of Wisconsin, have invented certain new and useful Improvements in Sawing-Machines; and do hereby declare that the following is a full, clear, and exact description thereof, reference being had to the accompanying drawing, and to the letters of reference marked thereon, making a part of this specification.

The nature of our invention consists in the construction and arrangement of a gang of rotary saws, as will be hereinafter fully set forth.

In order to enable others skilled in the art to which our invention appertains to make and use the same, we will now proceed to describe its construction and operation, referring to the annexed drawing, in which—

Figure 1:
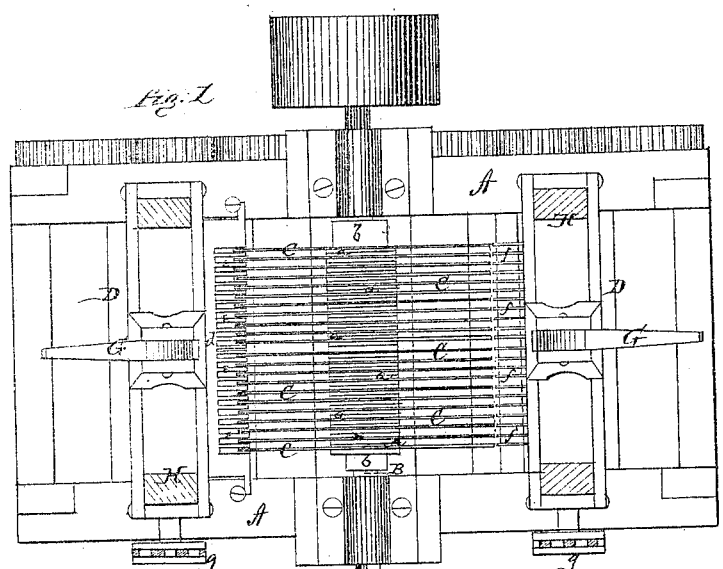
Figure 2:
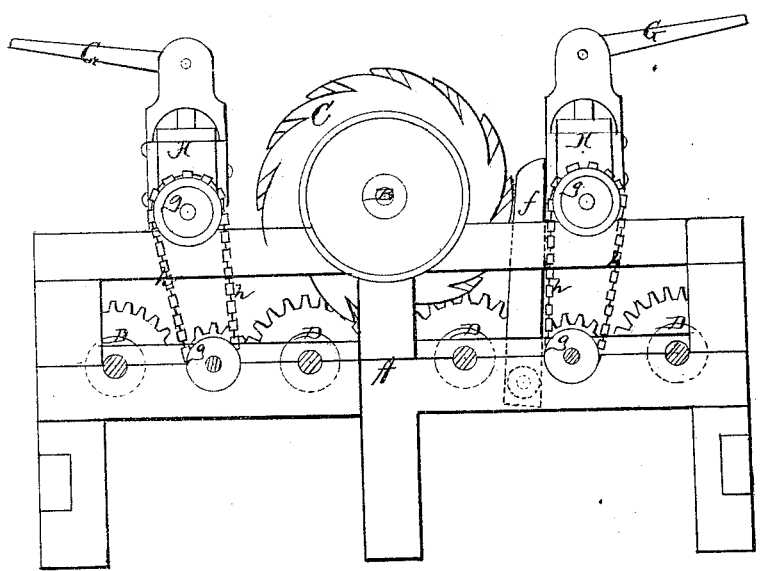
Figure 3:
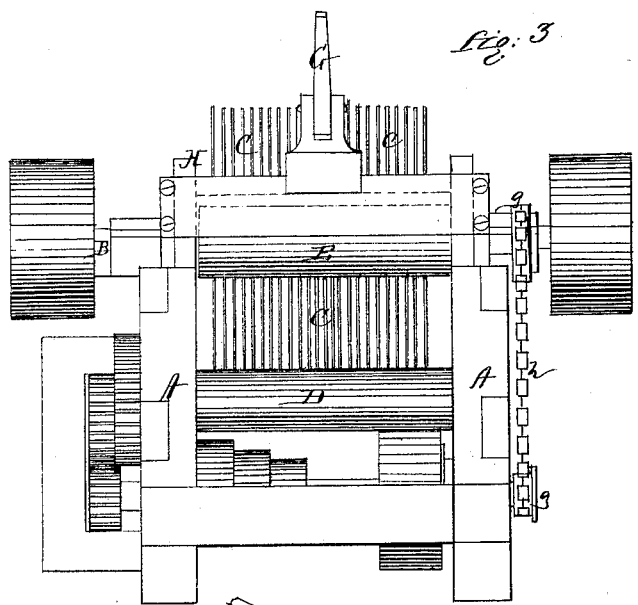
Figure 4:
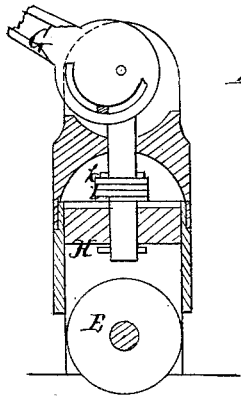

Figure 1 is a plan view, Fig. 2 a side elevation, and Fig. 3 a front view, of our machine. Fig. 4 is an enlarged transverse vertical section of the mechanism for regulating the press-rollers.

A represents the frame of our machine, on top of which, in the center, in suitable journal-boxes, is placed the mandrel B. On this mandrel are placed twelve or more saws, C C, with adjustable collars $a\ a$ between them.

To prevent any possible danger of the saws slipping or turning on the mandrel, there is a feather laid into the mandrel, and the saws and collars are slotted to fit. The whole is made fast by a burr, $b$, on each end of mandrel, inside of the bearings.

In front of the saws C C are guide-pins $e\ e$, so constructed as to prevent any chance for a single saw or the whole to run or crowd. These guide-pins are all attached to one bar, $d$, and provided with dovetailed slots on each side, for the purpose of inserting the leather to prevent the saws from coming in contact with the guide-pins. The guide-pins $e\ e$ are removed from between the saws by turning the bar $d$ back, to which they are attached.

In rear of the saws are wedges or guides $f\ f$, so constructed as to prevent the saws from scratching or recutting the boards, and to prevent the boards from tipping against the saws after they are through the cut.

In the lower part of the machine is mounted a series of feed-rollers, D D, and in the upper part, on each side of the saws, is a press-roller, E. These feed-rollers and press-rollers are geared together to prevent the log from feeding too fast, and also for the purpose of gigging the cant or log out of the cut in case of necessity.

The press-rollers E E are driven by means of pitch-wheels $g\ g$ and chains $h\ h$, and are provided each with an eccentric-lever, G, so constructed as to raise the rollers from the log and bring them in contact with the same.

The connection from the lever G to the press-roller frame H, in which the press-roller has its bearings, is provided with a rubber spring, $i$, for the purpose of letting the roller rise, when in operation, if any substance like sawdust or chips comes in contact with the roller.

The spring $i$ is provided with an iron washer, $k$, with a flange projecting on one side, to prevent the rubber from getting out of place when the power from the lever is attached.

The pitched chains $h$, that drive the press-rollers from the intermediate shafts between the feed-rollers, may be provided with pitch-wheel tighteners, for the purpose of taking up the slack chain.

Having thus fully described our invention, what we claim as new, and desire to secure by Letters Patent, is—

1. The combination of the press-roller E, frame H, and lever G, all constructed and arranged substantially as shown and described, and for the purposes herein set forth.

2. In combination with the roller E, frame H, and lever G, the rubber springs $i$, substantially as and for the purposes herein set forth.

3. The combination of the frame A, mandrel B, saws C C, guide-pins $e\ e$, guides $f\ f$, feed-rollers D D, press-rollers E, frames H H, and levers G G, all constructed and arranged substantially as shown and described, and for the purposes herein set forth.

In testimony that we claim the foregoing we have hereunto set our hands this 28th day of September, 1869.

SAML. S. SHERMAN.
    H. B. GUNN.

Witnesses:
 LEVI E. LATIMER,
 J. F. ALLEN.